No. 761,378. PATENTED MAY 31, 1904.
G. P. HAZELTON.
DEVICE FOR MEASURING TAPERS.
APPLICATION FILED JULY 3, 1902.
NO MODEL. 3 SHEETS—SHEET 2.
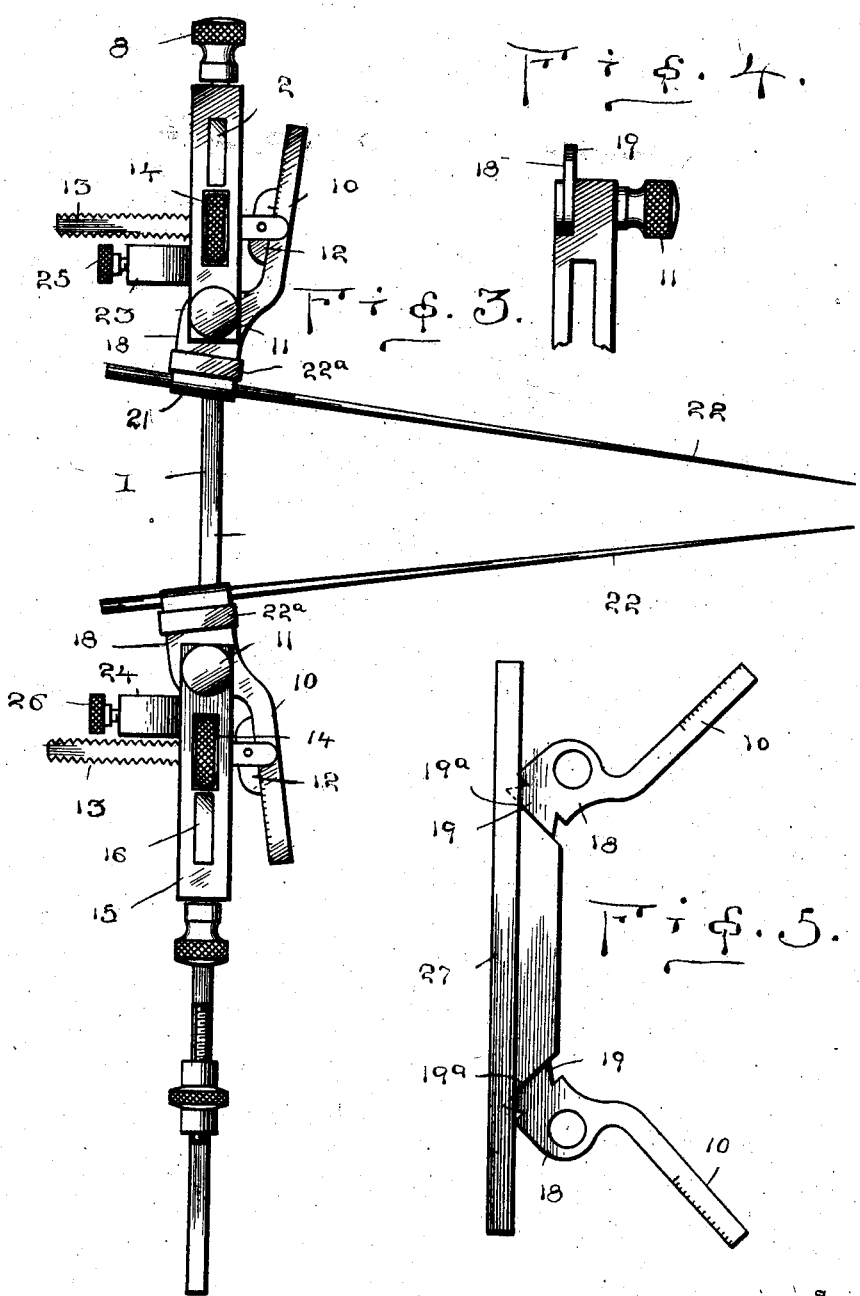

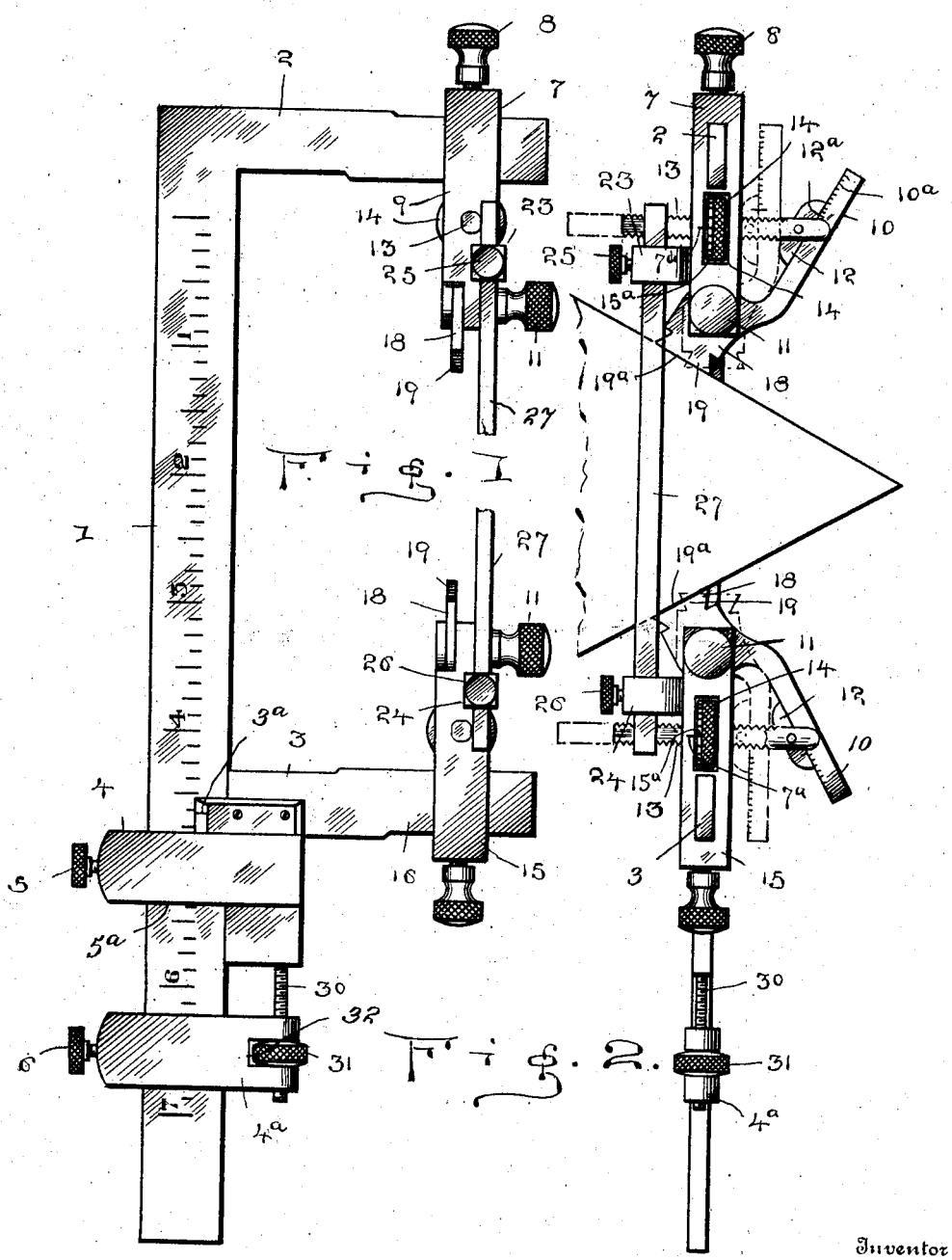

No. 761,378. PATENTED MAY 31, 1904.
G. P. HAZELTON.
DEVICE FOR MEASURING TAPERS.
APPLICATION FILED JULY 3, 1902.
NO MODEL. 3 SHEETS—SHEET 3.
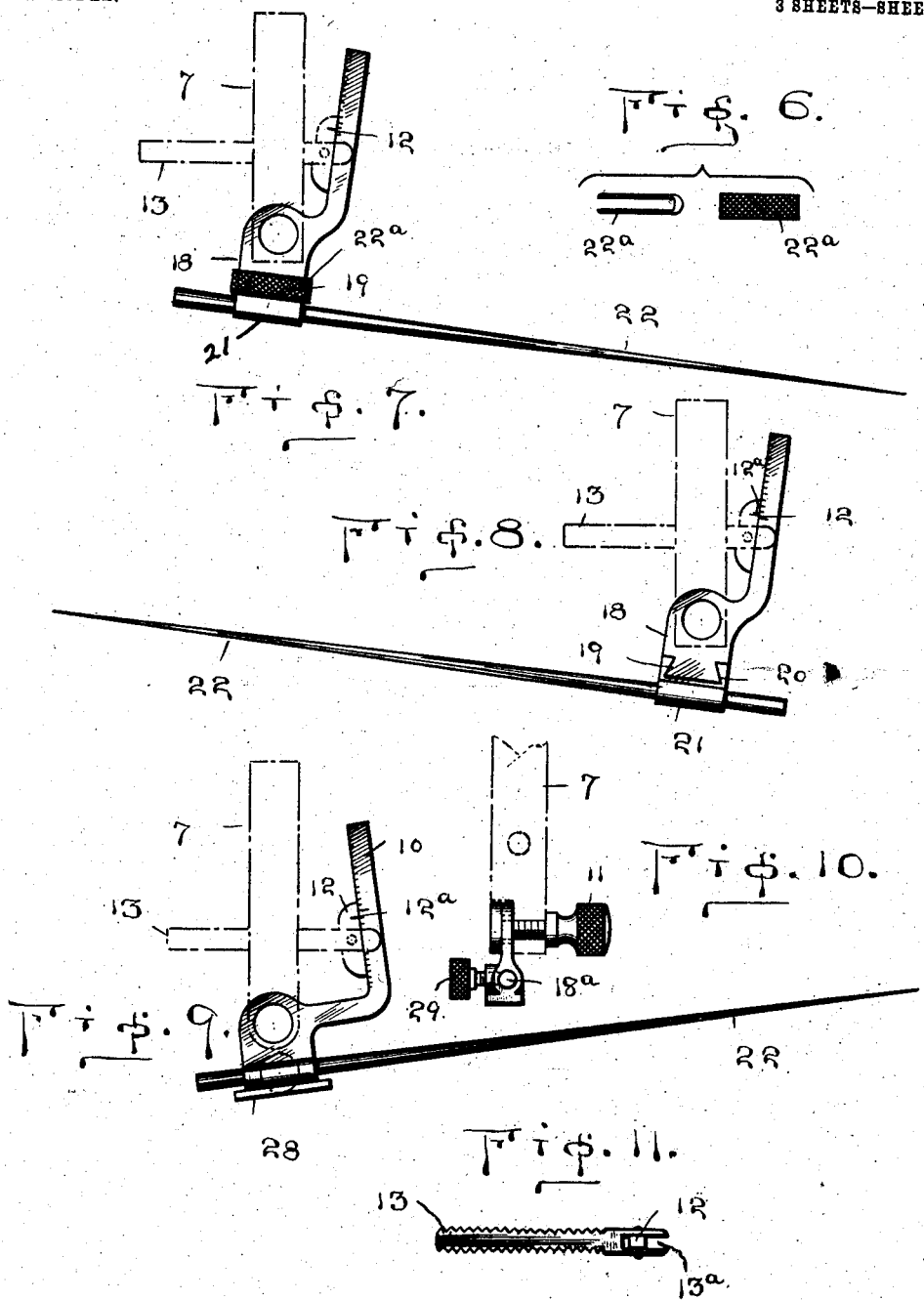

No. 761,378. Patented May 31, 1904.

UNITED STATES PATENT OFFICE.

GEORGE P. HAZELTON, OF NEWTONVILLE, MASSACHUSETTS.

DEVICE FOR MEASURING TAPERS.

SPECIFICATION forming part of Letters Patent No. 761,378, dated May 31, 1904.

Application filed July 3, 1902. Serial No. 114,270. (No model.)

*To all whom it may concern:*

Be it known that I, GEORGE P. HAZELTON, a citizen of the United States, residing at Newtonville, in the county of Middlesex and State of Massachusetts, have invented new and useful Improvements in Devices for Measuring Tapers, of which the following is a specification.

My invention has relation to new and useful improvements in measuring devices or instruments, and more especially to instruments of that character or type employed for the purpose of measuring or ascertaining the degree of angle at which converging lines or surfaces meet.

The object of the invention is to provide a device of the character mentioned, which is simple in construction, accurate and reliable in use, and which may be employed for measuring either the angles of exterior or interior surfaces of different tapered objects.

The invention consists in the novel construction of the various elements and their arrangement in operative combination, to be more fully described hereinafter, and the novelty of which will be particularly pointed out and distinctly claimed.

I have fully and clearly illustrated my invention in the accompanying drawings, forming a part of this specification, and wherein—

Figure 1 is a view in side elevation of a measuring instrument embodying my invention. Fig. 2 is a view in front elevation, showing the instrument in adjusted and operative position for ascertaining the angle of the exterior surfaces of a tapered object. Fig. 3 is a view in front elevation of the instrument, equipped with the means for measuring interior surfaces. Fig. 4 is an enlarged fragmentary view of one of the heads or slides. Fig. 5 is a plan view showing the measuring-arms in adjusted position for ascertaining the angle of beveled edges of a solid body. Fig. 6 is a view showing the fastening-clip for holding the pointers in position on the measuring-arms. Fig. 7 is a detail view of one of the arms, showing the pointers in position thereon and secured by means of the fastening-clip. Fig. 8 is a view showing the reverse side of the arm as disclosed in Fig. 7, the fastening-clip being removed. Fig. 9 is a view showing a modified form of the measuring-arm and the means for receiving the pointers thereto, and Fig. 10 is a top plan view of the threaded bar employed for actuating and adjusting the arm. Fig. 11 is a top plan view of one of the bars for actuating the measuring-arms.

Referring to the drawings, 1 designates a caliper arm or beam, preferably constructed from a rigid bar of metal and of such length as may be desired or required. This beam is provided at one end with a rigid arm or jaw 2, which is shown as being formed integral with the beam 1 and which extends laterally at right angles thereto. The beam 1 is also provided with a movable jaw 3, which is slidably arranged upon the said beam and is adapted to be moved toward or away from the arm 2, the beam being provided with suitable graduations whereby the distance between the fixed and movable jaws may be ascertained or regulated. The jaw 3 is rigidly secured in any suitable manner to a slide 4, formed with a slot $5^a$, through which the beam 1 extends in a manner well known in the art, said slide being movable along the beam to adjust the position of the movable jaw, a set-screw 5 being provided whereby the slide and jaw may be clamped rigidly to the beam to hold it in its adjusted position.

The scale on the beam is shown in inches, and the movable jaw 3 has thereon a mark of indication, as at $3^a$, which coacts with the scale for the purpose above mentioned—that is, to determine the distance between the jaws. It will be seen from the arrangement illustrated that the zero-point on the beam is a distance short of the fixed jaw and that when the movable jaw closely engages the fixed jaw the mark thereon will coincide with the zero-mark on the scale, and when the movable jaw is moved away from the fixed jaw the distance between the jaws will be accurately indicated by the mark $3^a$ on the scale.

$4^a$ designates a supplementary slide which is arranged upon the beam 1 and is movable longitudinally thereof. This slide is positioned in the rear of the slide 4 and carries a threaded rod 30, one end of which engages the slide 4 in order that a fine adjustment of the arm 3 with relation to the arm 2 may be accomplished. This rod 30 is projected or retracted by means of a milled thumb-nut 31, which is arranged in a slot 32, formed in the slide 4ª. This slide is also provided with a fastening or clamping screw 6, by means of which the slide may be clamped to the beam before operating the screw-rod 30.

Upon the jaw or arm 2 is disposed a head or slide 7, which is movable lengthwise of the said arm and is provided with a clamping-screw 8, which is arranged to engage the arm 2 in order to hold the slide rigidly in the position to which it may be adjusted. This head or slide 7 is provided upon its inner end with an extended portion 9, which carries the elements of the invention employed for the purpose of ascertaining and measuring the angles of surfaces. This measuring device consists of an arm 10, which at a point intermediate its length is pivoted to the extended portion 9 of the slide, the pivoted means for the arm consisting of a fastening device or set-screw 11, which may be tightened for the purpose of clamping the arm in any position to which it may be swung on its pivot. This arm 10 is provided with an actuating means which is mounted upon the slide 7 and consists of a threaded bar 13, which projects through the said slide transversely thereto and is adapted to be projected and retracted by means of a milled nut 14, which is arranged in a slot 14ª in the slide and through which the said threaded bar extends. At its outer end, or that end adjacent the arm 10, the threaded bar has pivotally mounted thereon a block 12, which is arranged within a bifurcation 13ª, Fig. 11, the arms of which extend upon either side of the arm 10, the block 12 and said arm slidably engaging the arm 10, so that the block 12 will be permitted to move along said arm toward the upper end thereof as the bar 13 is projected for the purpose of swinging the arm 10 on its pivot.

Slidably arranged upon a laterally-extending arm 16, projecting from the sliding jaw 3, is a slide or head 15, which is similar in construction to the slide 7 and which also carries a measuring-arm 10 and actuating device therefor, said arm and device being identical in form and construction to those mounted on the slide 7. The heads 7 and 15 are so arranged upon the jaws 2 and 16 that the arms 10 will be directed inwardly and disposed oppositely with relation to each other, and each arm is provided or formed at the opposite end from that engaged by the block 12 with a head 19, having a straight edge 19ª, which extends at right angles to the longitudinal axis of the arm and parallel to the actuating-bar 13 when in its retracted position, as shown in dotted lines in Fig. 2.

The blocks 12 above described are each provided with a simple indicator-mark, as shown at 12ª, which coacts with a graduated scale 10ª, marked upon the arms 10 and by means of which the angle of the surface being measured is ascertained. As above stated, the arms 10 when in their normal position, as shown in dotted lines in Fig. 2, extend at right angles to the bars 13, and when in this position the mark upon the blocks will register with the zero of the scale on the arms, the straight edges of the heads 19 being parallel with the said bars. It will be seen that when the threaded bars 13 are actuated by the milled nuts 14 the arms will be swung on their pivots and that the blocks 12 will move along the said arms, the indicator-mark pointing out on the graduated scale the angle the straight edge 19ª has assumed with relation to the actuating-bar and the arms 2 or 3. The graduated scale upon the arms 10, as is obviously necessary to the purpose at hand, is made in the degrees of a circle; but these degrees are necessarily made so small that it would be practically impossible to mark fractions of a degree which would be discernible to the naked eye. Therefore to overcome this difficulty I mark upon the periphery of the milled nut a scale of degrees and the fractional parts thereof, said scale being shown at 15ª, the graduations of which are adapted to register with an indicator-mark 7ª on the heads, as shown in Fig. 2.

It will be seen that the device as just described is a ready and reliable means of ascertaining the angle of exterior tapered surfaces, the straight edges 19ª being adapted to rest flush upon the surfaces being measured and the angle of said straight edges being readily ascertained from the scales on the arms 10 and the milled nuts 14. The angles which the surfaces bear to each other may then be ascertained as a simple matter of mathematical calculation.

An important feature of the invention is the means provided for permitting the measurement of tapered interior surfaces as well as those which are exterior. This means will now be described. The heads of each of the arms 10 are provided with a suitable means whereby a pointer 22 may be secured thereto, which pointers are arranged and adapted to be inserted within a hollow object to measure the tapers thereof.

As embodying the preferred form of means for securing the pointers in position on the arms I have shown the heads 18 of said arms as being dovetail in form, which are adapted to be engaged by a dovetailed slot 20, Fig. 8, formed in the sleeve 21, in which the pointer 22 is secured. The bore of these sleeves is made so as to be parallel with the straight edges 19ª, so that the angle at which said pointers are adjusted may be ascertained by the same means as that employed for determining the angles of the straight edges.

In order to prevent the pointers from becoming detached from the heads 18 of the arms 10, I provide fastening-clips 22ª, as shown in Fig. 6, which fit over the dovetailed portion of the heads and the portion of the sleeve 21, which engages said heads, as shown in Fig. 7, whereby said sleeve will be prevented from sliding off the arm.

On the sides of each of the heads 7 and 15 opposite to that upon which the arms 10 are mounted are provided slotted projections 23 24, which are preferably formed integral with the heads and which carry set-screws 25 26, respectively, which are adapted to removably and adjustably secure a member 27, constituting a straight edge. This straight edge is employed for the purpose of providing a base against which an object being measured may be rested or have one of its sides placed during measurement of the other sides, the said straight edge being arranged at right angles to the jaws 2 and 3.

In Figs. 9 and 10 I have shown a modified form of the heads 18 of the arms and the means for securing the pointers in position. In this form the heads of the arms are provided with tubular slots 18ª, in which the ends of the pointers are seated and held by means of set-screws 29, arranged in the heads and adapted to impinge the pointers 22 to hold the latter securely in position. The straight edge of the modified form is shown as consisting of a flange 28, the face of which is adapted to engage the surface of the object being measured.

The operation of the invention as above described is as follows: The body to be measured is placed upon or rested against the straight edge 27, and the movable jaw 3 of the caliper is moved up to a point approximating one side of the taper body. This having been done, the milled nuts 14 are turned to swing the arms 10 on their pivots, so that the straight edges 19ª will be moved and adjusted so as to lie flat upon the surfaces being measured. The arms and their straight edges having been adjusted, the thumb-nut 31 is then turned to force the movable jaw into close engagement with the object and the fastening-screws 11, screwed up to fasten the arms 10 in their adjusted position. The angles of the surfaces with reference to the arms 2 and 3 may be ascertained by means of the indications shown upon the graduated scales on the arms 10 and the milled nuts 14.

If the instrument is to be employed merely as a gage in lathework and for similar purposes, the straight edge 27 is removed from the lugs and the arms 10 may be adjusted to the desired position for the purpose of testing the taper of the work.

When it is desired to ascertain the angle of an interior-tapered surface, the sleeves 21, carrying the pointers 22, are placed upon heads of the arms. The slide 3 is then regulated with relation to the arm 2 in order that the said pointers may be inserted within the object to be measured. The arms to which the pointers are connected are then swung on their pivots by means of the nuts 14 and screw 13 until said pointers lie flat against the inner surface of the object and contact said surface throughout their entire length. The angle of the surface may then be ascertained by reference to the scale on the arms and the thumb-nuts 14.

What I claim, and desire to secure by Letters Patent, is—

1. In a measuring instrument, the combination with a beam provided with jaws, of slides carried by the jaws, a measuring-arm pivoted to each slide, bars on each slide connected to the arm and means for projecting the bar to swing the arm on its pivot.

2. In a measuring instrument, the combination with a beam provided with jaws, of slides carried by the jaws, a measuring-arm pivoted to each slide, a bar journaled on each slide, one end of said bar slidably engaging the arm and means to actuate the bar.

3. In a measuring instrument, the combination with a beam provided with jaws, of slides carried by the jaws, angle-measuring arms pivoted to the slides, means for swinging the arms on their pivots and coacting graduations on the arms and said means for indicating the angle to which the arms are moved.

4. In a measuring instrument the combination with a beam provided with jaws, of slides carried by the jaws, angle-measuring arms pivoted to the slides, means for swinging the arms on their pivots and removable pointers secured on the arms.

5. In a measuring instrument, the combination with a beam provided with jaws, of slides carried by the jaws, angle-measuring arms pivoted to the slides, means for swinging the arms on their pivots, pointers removably mounted on the arms and means to secure said pointers in position.

6. In a measuring instrument, the combination with a beam, provided with jaws, of slides carried by the jaws, angle-measuring arms pivoted to the slides, means to swing the arms on their pivots, pointers removably mounted on the arms, and fastening-clips to secure said pointers in position.

7. In a measuring instrument, the combination with a beam provided with jaws, of slides carried by the jaws angle-measuring arms pivoted to the slides, pointers removably mounted on the arms, and means to secure the pointers in position.

8. In a measuring instrument the combination with a beam, of a slide, an angle-measuring arm pivoted to the slide, means to adjust the arm on its pivot, and coacting graduations on the arm and said means to indicate the angle to which the arm is adjusted.

9. In a measuring instrument, the combination with a beam; of a slide, an angle-measuring arm pivoted to the slide, a threaded bar slidably disposed in the slide and engaging said arm and a nut for actuating said bar to swing the arm on its pivot.

In testimony whereof I affix my signature in presence of two witnesses.

GEORGE P. HAZELTON.

Witnesses:
JOSEPH P. SILSBY,
JOHN H. WINSLOW.